United States Patent
Dawkins et al.

(10) Patent No.: US 11,711,136 B2
(45) Date of Patent: Jul. 25, 2023

(54) UNMANNED AERIAL SYSTEM COMMUNICATION DUPLICATE REGISTRATION ID DETECTION AND RECOVERY

(71) Applicant: TENCENT AMERICA LLC, Palo Alto, CA (US)

(72) Inventors: Paul Spencer Dawkins, Garland, TX (US); Stephan Wenger, Hillsborough, CA (US); Shuai Zhao, Pleasanton, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 150 days.

(21) Appl. No.: 17/489,016

(22) Filed: Sep. 29, 2021

(65) Prior Publication Data

US 2022/0182131 A1 Jun. 9, 2022

Related U.S. Application Data (60) Provisional application No. 63/121,834, filed on Dec. 4, 2020.

(51) Int. Cl.
*H04B 7/185* (2006.01)
*B64C 39/02* (2023.01)
*B64U 101/20* (2023.01)

(52) U.S. Cl.
CPC ....... *H04B 7/18504* (2013.01); *B64C 39/024* (2013.01); *H04B 7/18532* (2013.01); *H04B 7/18545* (2013.01); *B64U 2101/20* (2023.01); *B64U 2201/10* (2023.01)

(58) Field of Classification Search
None
See application file for complete search history.

(56) References Cited

U.S. PATENT DOCUMENTS

| 2018/0090012 A1* | 3/2018 | Jo ........................ G08G 5/0078 |
| 2020/0279493 A1* | 9/2020 | Burgess ................ G08G 5/006 |
| 2022/0086741 A1* | 3/2022 | Liao ....................... H04W 4/50 |

FOREIGN PATENT DOCUMENTS

WO    2020/163760 A2    8/2020

OTHER PUBLICATIONS

International Search Report dated Dec. 20, 2021 in International Application No. PCT/US2021/053094.

(Continued)

*Primary Examiner* — Shripal K Khajuria
(74) *Attorney, Agent, or Firm* — Sughrue Mion, PLLC (57) ABSTRACT

Systems, apparatuses, and method may provide unmanned aerial system communication. A method performed by at least one processor included in an unmanned aerial system (UAS) includes: transmitting, to a UAS Service Supplier (USS) implemented on at least one server, a first registration request to register a first remote identification (RID) corresponding to the UAS with the USS; receiving, from the USS, an indication that the first RID is a duplicate RID that is registered with the USS; determining, based on the first RID, a second RID corresponding to the UAS; and transmitting, to the USS, a second registration request to register the second RID.

20 Claims, 7 Drawing Sheets

(56) References Cited

OTHER PUBLICATIONS

Written Opinion of the International Searching Authority dated Dec. 20, 2021 in International Application No. PCT/US2021/053094.
Malek Murison, "Everything You Need to Know About the FAA's NPRM on Remote ID", Drone Base, 2020, Retrieved from: URL: <https://blog.dronebase.com/everything-you-need-to-know-about-the-faas-nprm-on-remote-id> (6 pages total).
Robert Moskowitz et al., "draft-ietf-drip-rid-04", Internet Engineering Task Force, Nov. 1, 2020 (work in progress), 14 pages.

\* cited by examiner

UNMANNED AERIAL SYSTEM COMMUNICATION DUPLICATE REGISTRATION ID DETECTION AND RECOVERY

CROSS-REFERENCE TO RELATED APPLICATION

This application claims priority from U.S. Provisional Application No. 63/121,834, filed on Dec. 4, 2020, the disclosure of which is incorporated herein by reference in its entirety.

FIELD

Embodiments of the present disclosure relate to design and operation of unmanned aerial systems, and more specifically, monitoring and allocation of unmanned aerial vehicle media sessions and managing network resources.

BACKGROUND

An unmanned aerial vehicle (UAV) may have an identification (ID) associated with it. Indeed, some UAVs are mandated to have an ID before becoming airborne. For example, in North America, the Federal Aviation Administration (FAA) is making regulations to make sure all UAVs have some sort of identification to be legal to fly, and such identification is called a remote identification (RID) for a drone or UAV.

For various reasons, including manufacturing errors and registration procedure errors, RIDs may be duplicated for two or more unmanned aerial systems (UASes). This can result in a registration failure when these UASes attempt to register with a UAS Service Supplier (USS), which may prevent take-off for a UAV with a duplicate RID.

SUMMARY

According to one or more embodiments, a method performed by at least one processor included in an unmanned aerial system (UAS) is provided. The method includes: transmitting, to a UAS Service Supplier (USS) implemented on at least one server, a first registration request to register a first remote identification (RID) corresponding to the UAS with the USS; receiving, from the USS, an indication that the first RID is a duplicate RID that is registered with the USS; determining, based on the first RID, a second RID corresponding to the UAS; and transmitting, to the USS, a second registration request to register the second RID.

According to one or more embodiments, a device included in an unmanned aerial system (UAS) is provided. The device includes: at least one memory configured to store program code; and at least one processor configured to read the program code and operate as instructed by the program code. The program code includes: first transmitting code configured to cause the at least one processor to transmit, to a UAS Service Supplier (USS) implemented on at least one server, a first registration request to register a first remote identification (RID) corresponding to the UAS with the USS; first receiving code configured to cause the at least one processor to receive, from the USS, an indication that the first RID is a duplicate RID that is registered with the USS; determining code configured to cause the at least one processor to determine, based on the first RID, a second RID corresponding to the UAS; and second transmitting code configured to cause the at least one processor to transmit, to the USS, a second registration request to register the second RID.

According to one or more embodiments, a non-transitory computer-readable medium storing instructions is provided. The instructions are configured to, when executed by at least one processor of a device included in an unmanned aerial system (UAS), cause the at least one processor to: transmit, to a UAS Service Supplier (USS) implemented on at least one server, a first registration request to register a first remote identification (RID) corresponding to the UAS with the USS; receive, from the USS, an indication that the first RID is a duplicate RID that is registered with the USS; determine, based on the first RID, a second RID corresponding to the UAS; and transmit, to the USS, a second registration request to register the second RID.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
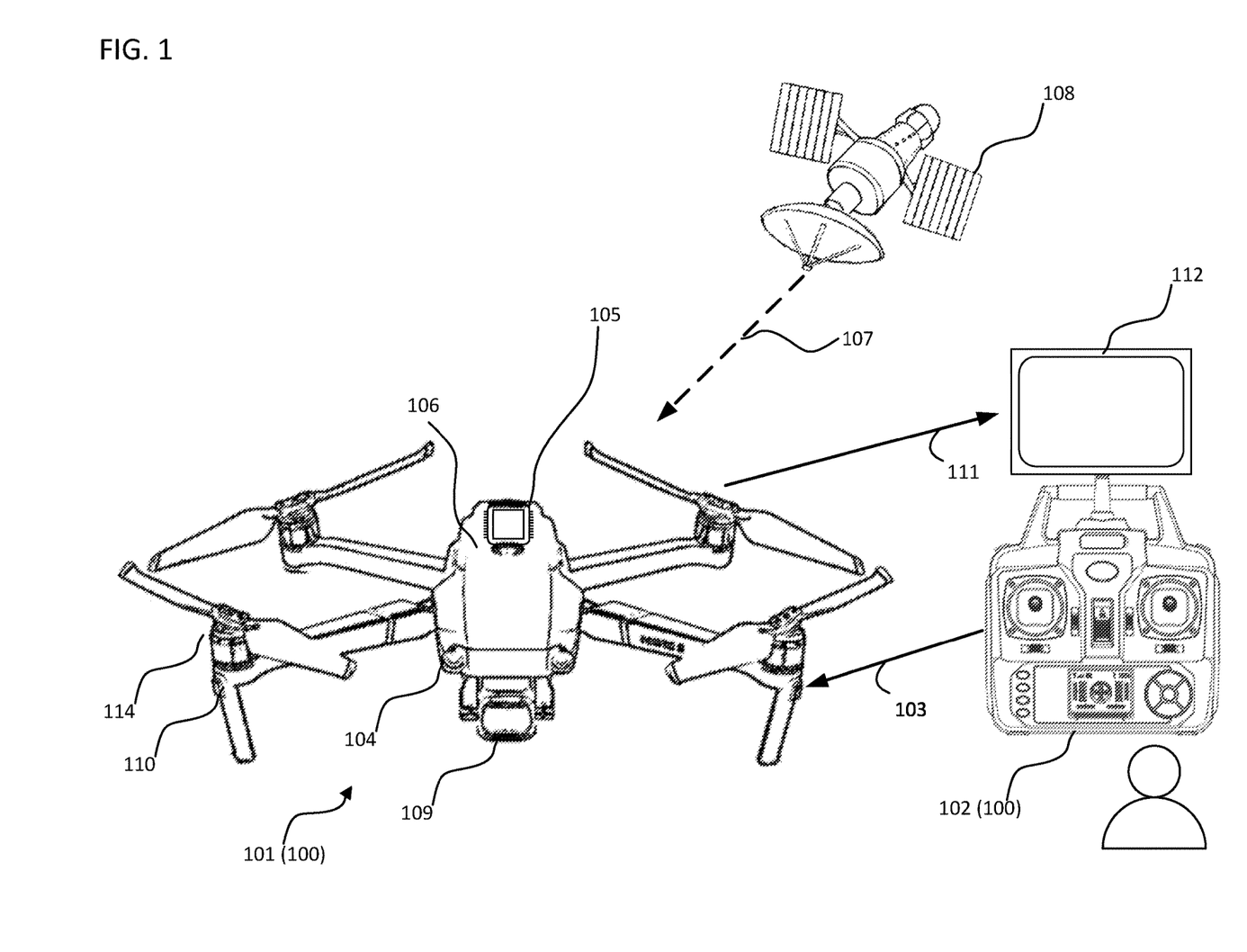
FIG. 1 is a schematic illustration of an unmanned aerial system (UAS), in accordance with an embodiment.

Referring to FIG. 1, an unmanned aerial system (UAS) (100) can include an unmanned aerial vehicle (UAV) (101) and a controller (102). The controller (102) can use a data link (103) to communicate control commands from the controller (102) to the UAV (101). The controller (102) may include at least one communication circuit that is configured to provide communication including the data link (103), via very high frequency (VHF), ultra-high frequency (UHF), or other wireless technology that is analog or digital radio conveying. The controller (102) via the data link (103) may control power levels of the engines (114) of the UAV (101) or control surfaces of the UAV (101). More abstract commands like pitch, yaw, and roll, similar to those of helicopters or aircraft, can also be used. An experienced pilot can operate some UAVs with those basic controls, not relying on any advanced onboard processing of control signals inside a UAV. UAVs have been available in many forms, including as helicopters and aircraft.

Advances in onboard electronic designs more recently allow the offload of certain tasks from the human operator to the UAV itself. Many UAVs, today, include sensor(s) (104) that indicate to an onboard controller (105) of the UAV (101) characteristics of the UAV (101) such as, for example, the attitude and the acceleration of the UAV (101). The onboard controller (105) can be a computer system with a scaled-down or non-existent user interface. The information obtained by the sensor(s) (104), in addition to the control inputs received from the data link (103) from the controller (102), may allow the UAV (101) to remain stable unless positive control input is obtained from the controller (102).

Even more recently, UAVs can include a receiver (106) configured to receive communication from one of the Global Navigation Satellite Systems (GNSS), such as the Global Positioning System (GPS) operated by the United States. FIG. 1 illustrates a single satellite (108) that provides a signal (107) as such communication, to represent a GNSS. However, the receiver (106) of the UAV (101) may receive communication from a GNSS that includes three or more, and typically four or more, line-of-sight satellites to triangulate the position of the UAV (101) in space. The receiver (106), which may be a GNSS receiver, may determine with fair accuracy the position of the UAV (101) in space and time. In some UAVs, a GNSS can be augmented by additional sensors (such as an ultrasonic or LIDAR sensor) of the UAV (101) on the vertical (Z-) axis to enable soft landings (not depicted). The UAV (101), according to some embodiments, may be configured to perform features such as "fly home" and "auto-land" based on GNSS capabilities, where the UAV (101) flies to a location that was defined as its home location. Such features may be performed by the UAV (101) based upon a simple command from the controller (102) (like: the push of a single button) or in case of a loss of the data link (103) from the controller (102) or other timeout of meaningful control input.

As another recent development, the UAV (101) may also include one or more cameras (109). In some cases, the UAV (101) may include a gimbal-mounted camera as one of the cameras (109) and can be used to record pictures and video of a quality sufficient for the UAV's users—today, often in High Definition TV resolution. In some cases, the UAV (101) may include other cameras (110), often covering some or all axes of movement, and the UAV (101) may be configured to perform onboard signal processing based on signals from the cameras (110) for collision avoidance with both fixed and moving objects.

In some cases, the UAV (101) may include a "main" camera as one of the cameras (109) and its camera signal can be communicated by a communication interface (e.g. communication circuit) of the UAV (101) via a data link (111) in real-time towards the human user, and displayed on a display device (112) included in, attached to, or separate from the controller (102). The data link (111) may be the same as or different from the data link (103). Accordingly, UAVs may be successfully flown out of line-of-sight of a human pilot, using a technique known as "First Person View" (FPV).

Figure 2:
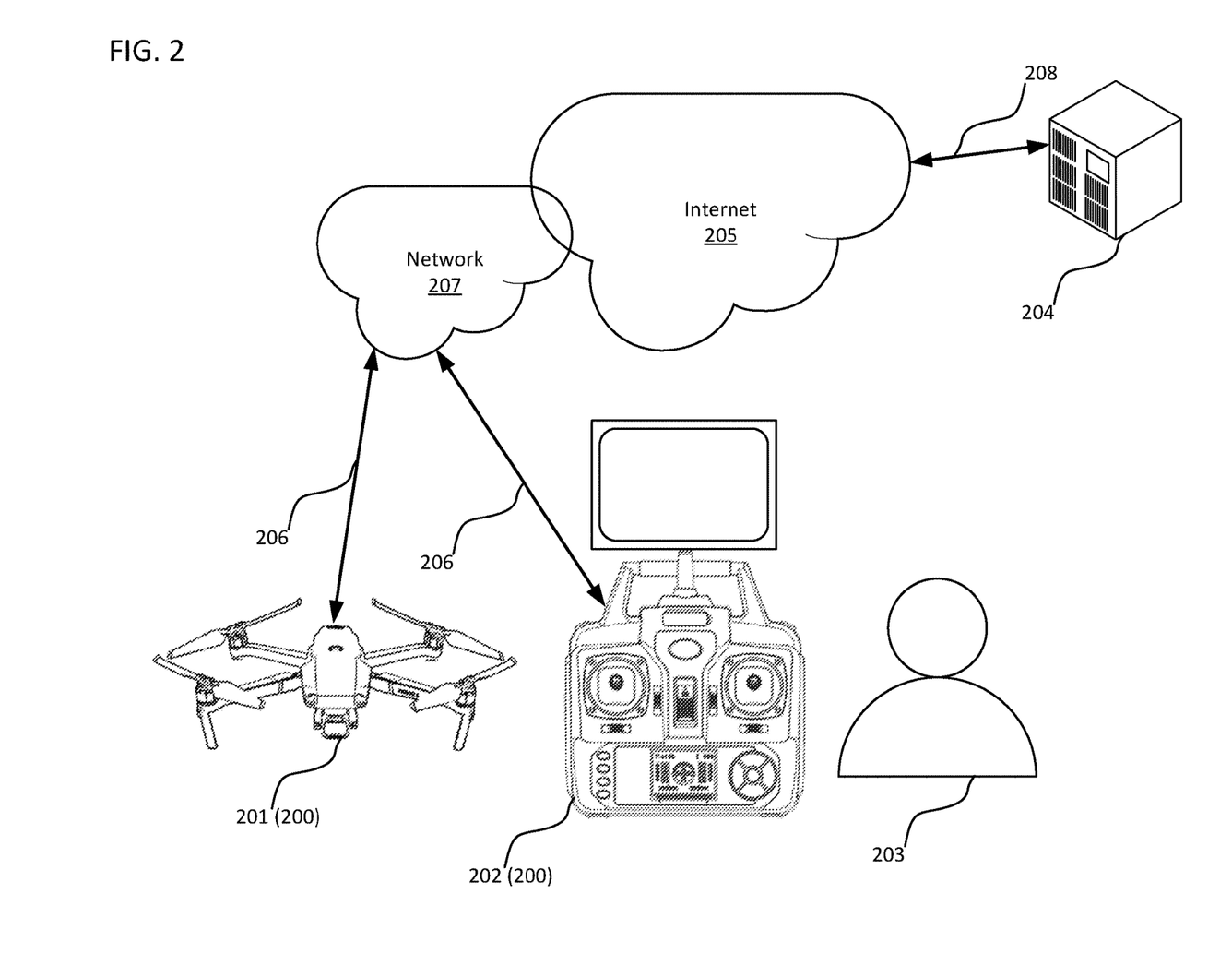
FIG. 2 is a schematic illustration of a UAS that includes UAS communication with at least one server, in accordance with an embodiment.

Referring to FIG. 2, a UAS (200) may include a UAV (201) and a controller (202). The UAV (201) and the controller (202) may be the same or similar to the UAV (101) and the controller (102) illustrated in FIG. 1, respectively. According to an embodiment, the UAS (200), potentially operated by a UAS operator (203) such as a human pilot, may be configured to inform one or more UAS Service Suppliers (USSs) (204) about the position of the UAV (201) in real-time. In embodiments, the USS may be implemented on or using, for example, a server. The reporting can be conducted using the Internet (205). For all but the most exotic use cases involving tethered UAVs, this may imply that one or both of the UAV (201) and the controller (202) of the UAS (200) may configured to have a connection (206) over a wireless network such as a network (207) (e.g. a cellular network) to the Internet (205), and the USS (204) also may have a connection (208) to the Internet (205). Such a scenario may be assumed herein, but embodiments of the present disclosure are not limited thereto. Networks other than the Internet (205) may also be used. For example, conceivably, a closed wireless network that is not the Internet could be used to communicate between the UAS (200) and the USS (204). Closed wireless networks may be used for certain military UAVs. When referring to the "Internet" henceforth, such networks are meant to be included.

Many physical wireless network technologies may be deployed in uses that enable connections (206) (e.g. wireless connections) and networks (207) (e.g. wireless networks) to connect systems such as the controller (202) or the UAV (201) of the UAS (200) to the Internet (205). For outdoor applications, mobile networks may be used such as, for example, $5^{th}$ Generation or "5G" networks. Henceforth, the use of such a 5G network may be assumed but embodiments of the present disclosure are not limited thereto. Other physical network technologies can equally be employed, including for example, 3G, 3.5G, 4G, LTE mobile networks, wireless LAN in infrastructure or ad hoc mode, zig-bee, and so on. In embodiments of the present disclosure, a mobile network carrying the Internet can offer bi-directional communication, such as, for example, between the UAS (200) and the USS (204). The Quality of Service in each direction may differ however. According to embodiments of the present disclosure, the UAV (201), the controller (202), and/or the USS (204) may include communication interfaces (including for example, a transmitter and/or a receiver) and at least one processor with memory that implements one or more of the physical wireless network technologies, so as to be configured to communicate via one or more of the network types of the present disclosure.

With reference to FIG. 2, the connections (206) between the Internet (205) through a network (207) (e.g. a cellular network) to the UAV (201) and/or the controller (202) can be bi-directional. When using Internet protocols such as Internet Protocol (IP), Transmission Control Protocol (TCP), User Datagram Protocol (UDP), Hypertext Transfer Protocol (HTTP), Quick UDP Internet Connections (QUIC), and similar, for the communication between the UAS (200) and the USS (204), then by the nature of such protocols, a bi-directional link may be required for those protocols to work.

As discussed above, a UAV, for example UAV (101) or UAV (201), may have an identification (ID) associated with it. Indeed, some UAVs are mandated to have an ID before becoming airborne. For example, in North America, the Federal Aviation Administration (FAA) is making regulations to make sure all UAVs have some sort of identification to be legal to fly, and such identification is called a remote identification (RID) for a drone or UAV.

A few RID types have been identified by the Civil Aviation Authority (CAA) and all RID must be registered to a USS, for example USS (204). The USS maintains all direct communications with a UAS and forwards appropriate information to UTM. UTM may have other sources of information on UAS and may query the USS for more information on a UAS, for example UAS 200.

The following are examples of RID types.

An American National Standards Institute (ANSI) and Consumer Technology Association (CTA) ANSI/CTA-2063-A Serial Number. This may be assigned to a UAS by a manufacturer of the UAS, and may be hard coded into hardware of UAV (201). The UAS operator (203) may use this number to register with the USS (204).

A CAA-level Assigned Registration Number. This registration number may be assigned by a local or international CAA. The UAS operator (203) may use this number to register with the USS (204).

A universally unique identifier (UUID). This number may be created by the manufacturer of UAS (200) manufacturer or created by the USS (204) during registration. In either case, the UAS operator (203) may use this number to register with the USS (204).

The Internet Engineering Task Force (IETF) is developing another RID type called Hierarchical Host Identity Tag (HHIT) which may also be used for UAS (200) registration to a USS (204). The UAS operator (203) may use this number to register with the USS (204).

In embodiments, whatever RID type has been assigned to a UAS (200), the RID must be registered to a USS (204). In order for the UAS (200) to register with the USS, the UAS (200) must present a unique RID to the USS (204).

Two of the RID types described above, ANSI/CTA-2063-A Serial Number and CAA-level Assigned Registration Number, may be statically assigned, for example to the UAS (200, or to the UAV (201), and may be used by the UAS (200) for registration.

As discussed above, for various reasons, including manufacturing errors and registration procedure errors, RIDs of these RID types can be duplicated for two or more UASes (200). This can result in a registration failure when these UASes (200) attempts to register with a USS (204), which prevents take-off for the UAV (201) being controlled. Since these registration types are statically assigned, there is no way for the UAS to recover from this condition.

Figure 3:
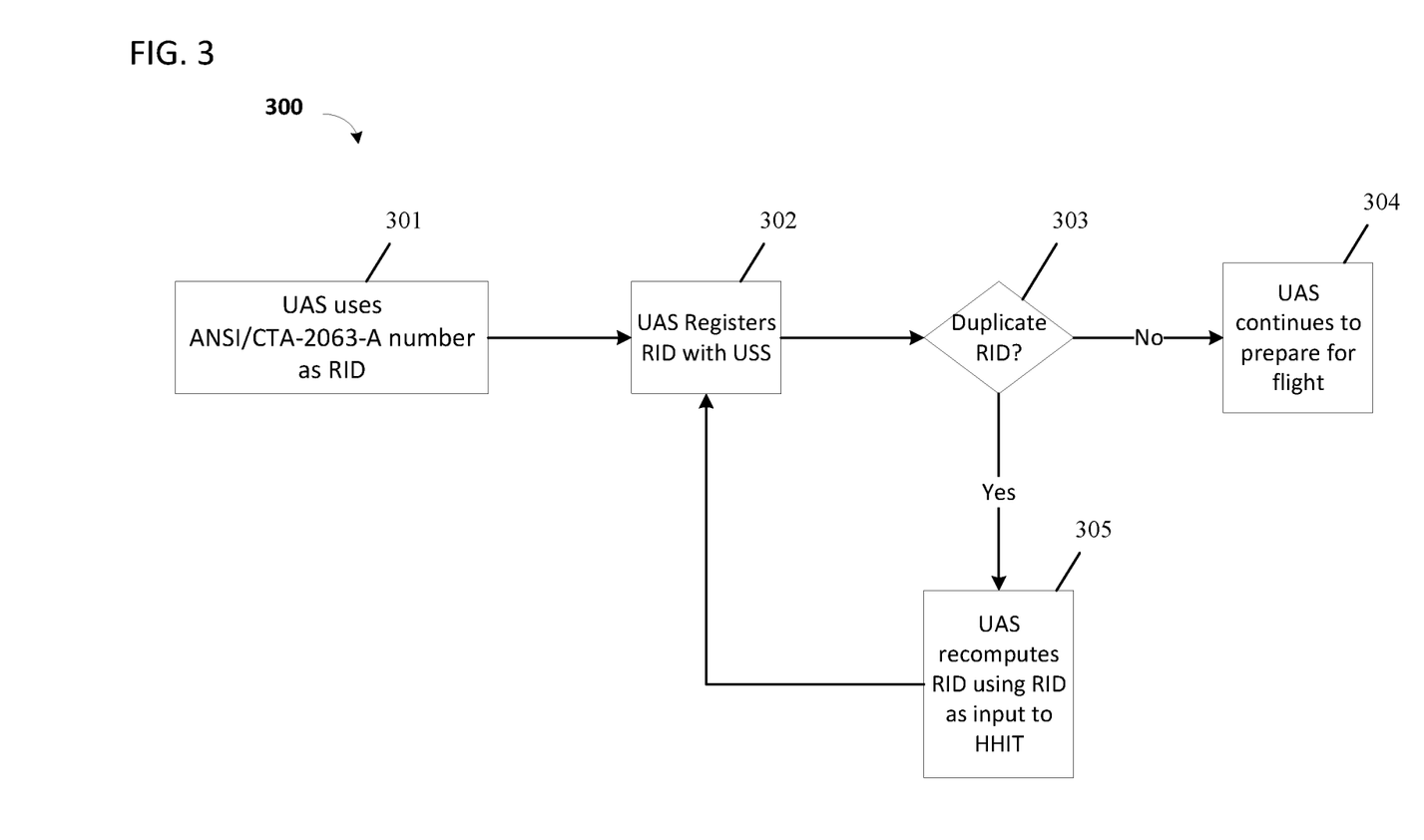
FIG. 3 is schematic illustration of a high-level procedure for UAS registration, in accordance with an embodiment.

FIG. 3 shows an example process 300 for registering a UAS, for example UAS (200), using an ANSI/CTA-2063-A serial number. In process 300, a UAS (200) may determine the ANSI/CTA-2063-A serial number it will use as a RID at block 301. For example, the UAS may determine an ANSI/CTA-2063-A serial number that is hard coded into hardware of UAV (201). At block 302, UAS (200) attempts to register this RID with a USS (204).

If this registration succeeds at block 303, the UAS (200) may continue to prepare for flight of UAV (201) at block 304.

If this registration fails because the RID is a duplicate at block 303, the UAS (200) may use the current RID as input to compute a 64-bit Overlay Routable Cryptographic Hash Identifiers (ORCHID) hash, and then use this hashed valued to construct a HHIT at block 305. Then, UAS (200) may attempt to register with the USS (204) using this HHIT as the RID at block 302.

Figure 4:
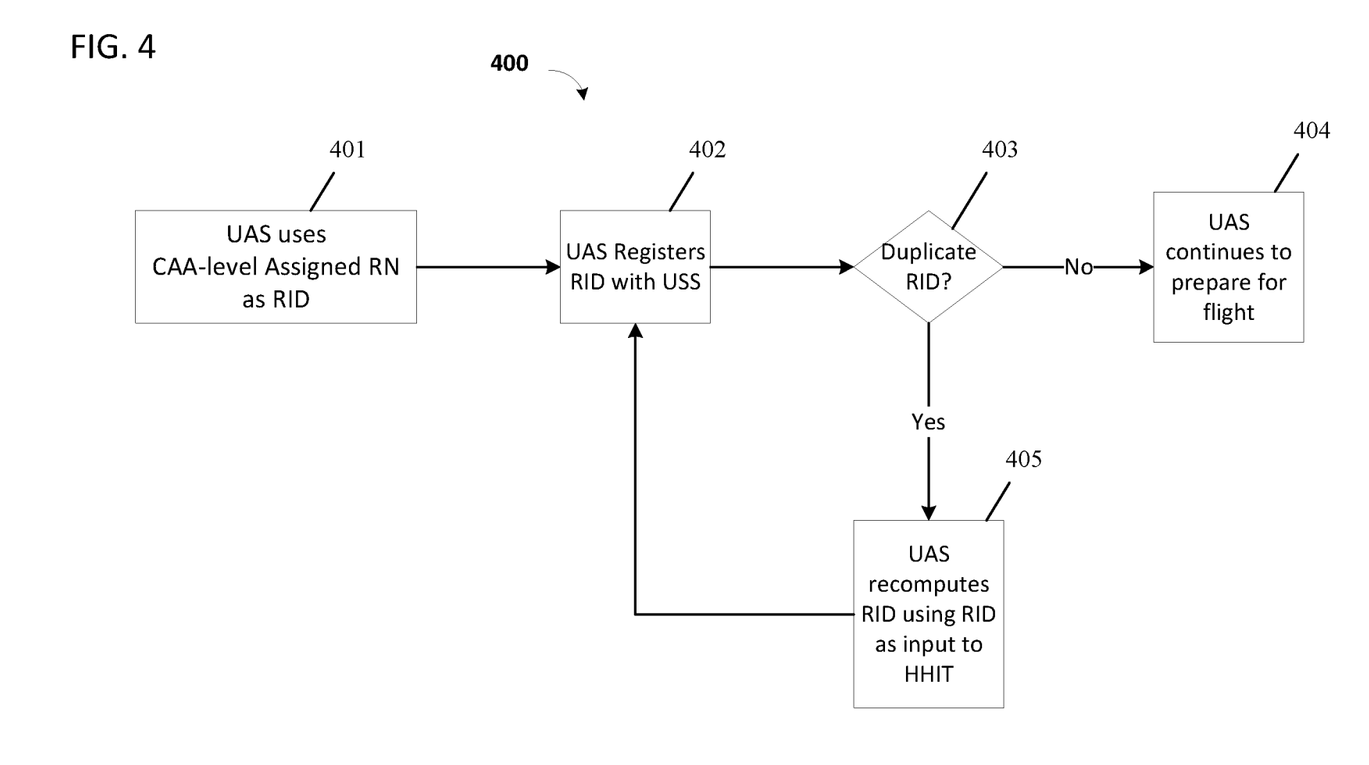
FIG. 4 is schematic illustration of a high-level procedure for UAS registration, in accordance with an embodiment.

FIG. 4 shows an example process 400 for registering a UAS, for example UAS (200), using CAA-level assigned registration number. In process 400, a UAS (200) may determine the CAA-level assigned registration number it will use as a RID at block 401, and may attempt to register this RID with a USS (204) at block 402.

If this registration succeeds at block 403, the UAS (200) may continue to prepare for flight at block 404.

If this registration fails because the RID is a duplicate at block 403, the UAS (200) may use the current RID as input to compute a 64-bit ORCHID hash, and then use this hashed valued to construct a HHIT at block 405. Then, UAS (200) may attempt to register with the USS (204) using this HHIT as the RID at block 402.

In embodiments, a HHIT RID may be used because HHIT RIDs use a 64-bit hash size, so have a 0.01% probability of collision given a population of 66 million HHIT RIDs.

Accordingly, embodiments may provide a method of allowing a UAS to recover from registration failures due to duplicate Registration IDs of the ANSI/CTA-2063-A Serial Number type by attempting registration with a Registration Number created by hashing the duplicate Registration Number using the IETF HHIT algorithm, with the ANSI/CTA-2063-A Serial Number used as input.

Further, embodiments may provide a method of allowing a UAS to recover from registration failures due to duplicate Registration IDs of the CAA-level Assigned Registration Number type by attempting registration with a Registration Number created by hashing the duplicate Registration Number using the IETF HHIT algorithm, with the CAA-level Assigned Registration Number used as input.

In embodiments, and as for example described above, the ANSI/CTA-2063-A Serial Number, CAA-level Assigned Registration Number, and Universally Unique IDentifier (UUID) may be serial numbers or registration numbers which may be assigned to or associated with any one of UAS (100), UAV (101), controller (102), UAS (200), UAV (201), controller (202), or any associated hardware or software, and may be assigned or associated by any one of a manufacturer, a local or international CAA, or any other serial number or registration number authority as desired.

Figure 5A:
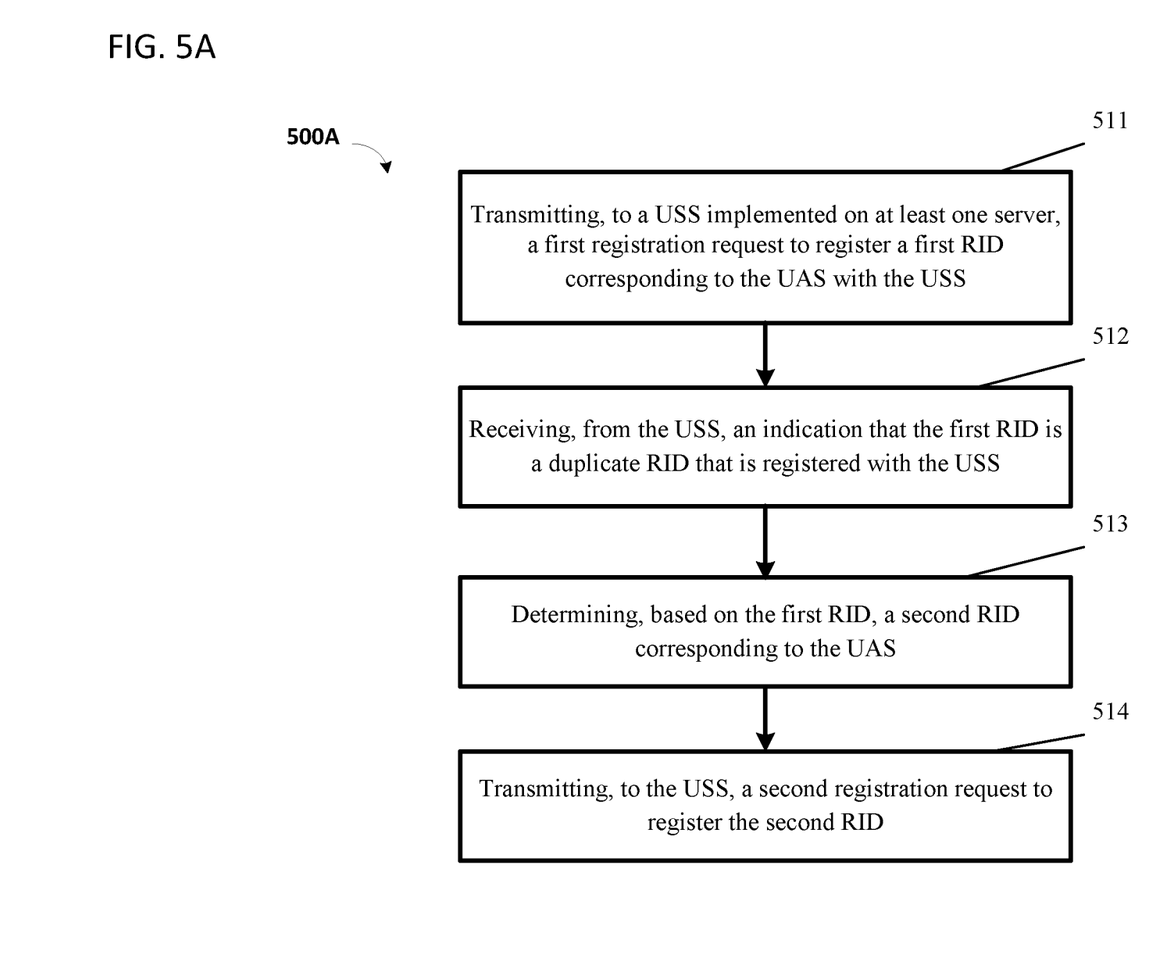
FIGS. 5A-5C are schematic illustrations of high-level workflows of UAS registration, in accordance with an embodiment.
Figure 5B:
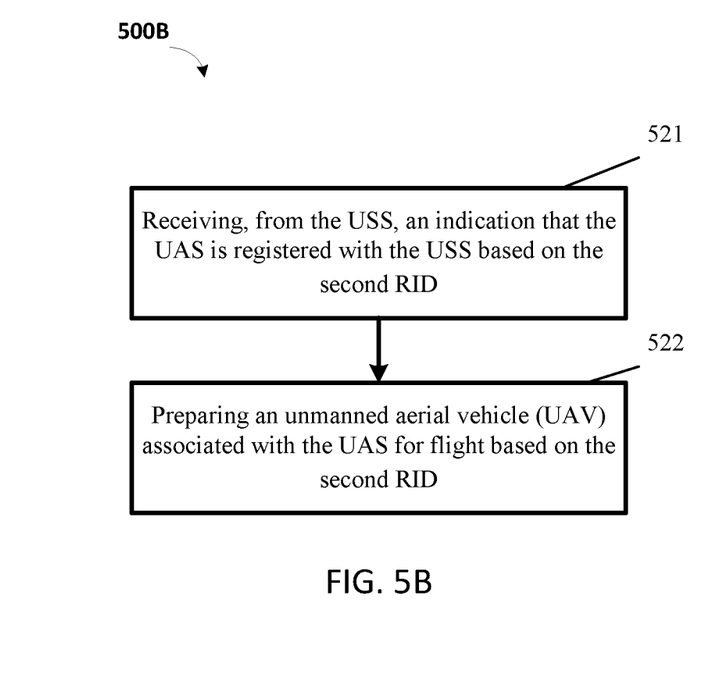
Figure 5C:
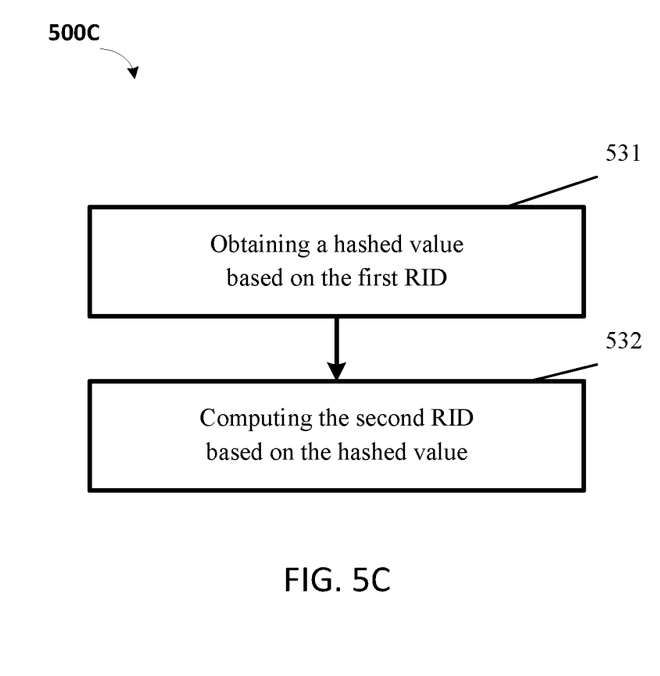

FIGS. 5A-5C are flowcharts illustrating example processes 500A-500C for managing a UAS, for example during a UAS registration process. FIGS. 5A-5C may be described with the aid of FIGS. 1-4. In embodiments, one or more blocks of processes 500A-500C may be combined in any order.

As shown in FIG. 5A, process 500A may include transmitting, to a USS implemented on at least one server, a first registration request to register a first RID corresponding to the UAS with the USS (block 511). In embodiments, the UAS may correspond to UAS (100) and/or UAS (200), and the USS may correspond to USS (204). In embodiments, the first registration request may correspond to blocks 301-302 or blocks 401-402 discussed above, and the first RID may correspond to or include the ANSI/CTA-2063-A serial number, the CAA-level assigned registration number or any other identifier discussed above.

As further shown in FIG. 5A, process 500A may include receiving, from the USS, an indication that the first RID is a duplicate RID that is registered with the USS (block 512).

As further shown in FIG. 5A, process 500A may include determining, based on the first RID, a second RID corresponding to the UAS (block 513).

As further shown in FIG. 5A, process 500A may include transmitting, to the USS, a second registration request to register the second RID (block 514). In embodiments, the second registration request may correspond to blocks 305-302 or blocks 405-402 discussed above, and the second RID may correspond to or include the ANSI/CTA-2063-A serial number, the CAA-level assigned registration number or any other identifier discussed above.

In embodiments, the first RID may include an ANSI/CTA-2063-A serial number.

In embodiments, the ANSI-CTA-2063-A serial number may be coded into hardware of UAV associated with the UAS. In embodiments, the UAV may correspond to UAV (101) and/or UAV (201)

In embodiments, the first RID may include a Civil Aviation Authority (CAA) assigned registration number.

In embodiments, process 500B illustrated in FIG. 5B may be combined with process 500A. For example, blocks of process 500B may be performed after block 514 of process 500A.

As shown in FIG. 5B, process 500B may include receiving, from the USS, an indication that the UAS is registered with the USS based on the second RID (block 521).

As further shown in FIG. 5B, process 500B may include preparing an unmanned aerial vehicle (UAV) associated with the UAS for flight based on the second RID (block 522).

In embodiments, process 500C illustrated in FIG. 5C may be combined with process 500A. For example, blocks of process 500C may be performed in combination with block 513 of process 500A. In embodiments, blocks of process 500C may be sub-blocks of block 513 of process 500A.

As shown in FIG. 5C, process 500C may include obtaining a hashed value based on the first RID (block 531).

As further shown in FIG. 5A, process 500A may include computing the second RID based on the hashed value (block 532).

In embodiments, the hashed value may be a 64-bit hashed value.

In embodiments, the hashed value may be an Overlay Routable Cryptographic Hash Identifiers (ORCHID) hashed value.

In embodiments, the second RID may include an Internet Engineering Task Force (IETF) Hierarchical Host Identity Tag (HHIT) constructed based on the hashed value.

It may be appreciated that FIGS. 5A-5C provide only illustrations of implementations, and do not imply any limitations with regard to how different embodiments may be implemented. Many modifications to the depicted environments may be made based on design and implementation requirements.

Although FIGS. 5A-5C show example blocks of processes 500A-500C, in some implementations, processes 500A-500C may include additional blocks, fewer blocks, different blocks, or differently arranged blocks than those depicted in FIGS. 5A-5C. For example, any one or more of the blocks included in processes 500A-500C may be performed in place of, or in combination with, any other one or more blocks included in processes 500A-500C, in any order. Additionally. or alternatively, two or more of the blocks of processes 500A-500C may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

Systems of the present disclosure may comprise at least one processor and memory storing computer code. The computer code, when executed by the at least one processor, may be configured to cause the at least one processor to perform the functions of the embodiments of the present disclosure. For example, the UASs, UAVs, and USSs of the present disclosure may each include a respective at least one processor and memory storing computer code configured to cause the UASs, UAVs, and USSs to perform their respective functions.

The techniques for Unmanned Aerial System Communication described above can be implemented in, for example, controller and UAV, as computer software using computer-readable instructions and physically stored in one or more computer-readable media. For example, FIG. 6 shows a computer system 600 suitable for implementing certain embodiments of the disclosed subject matter.

Figure 6:
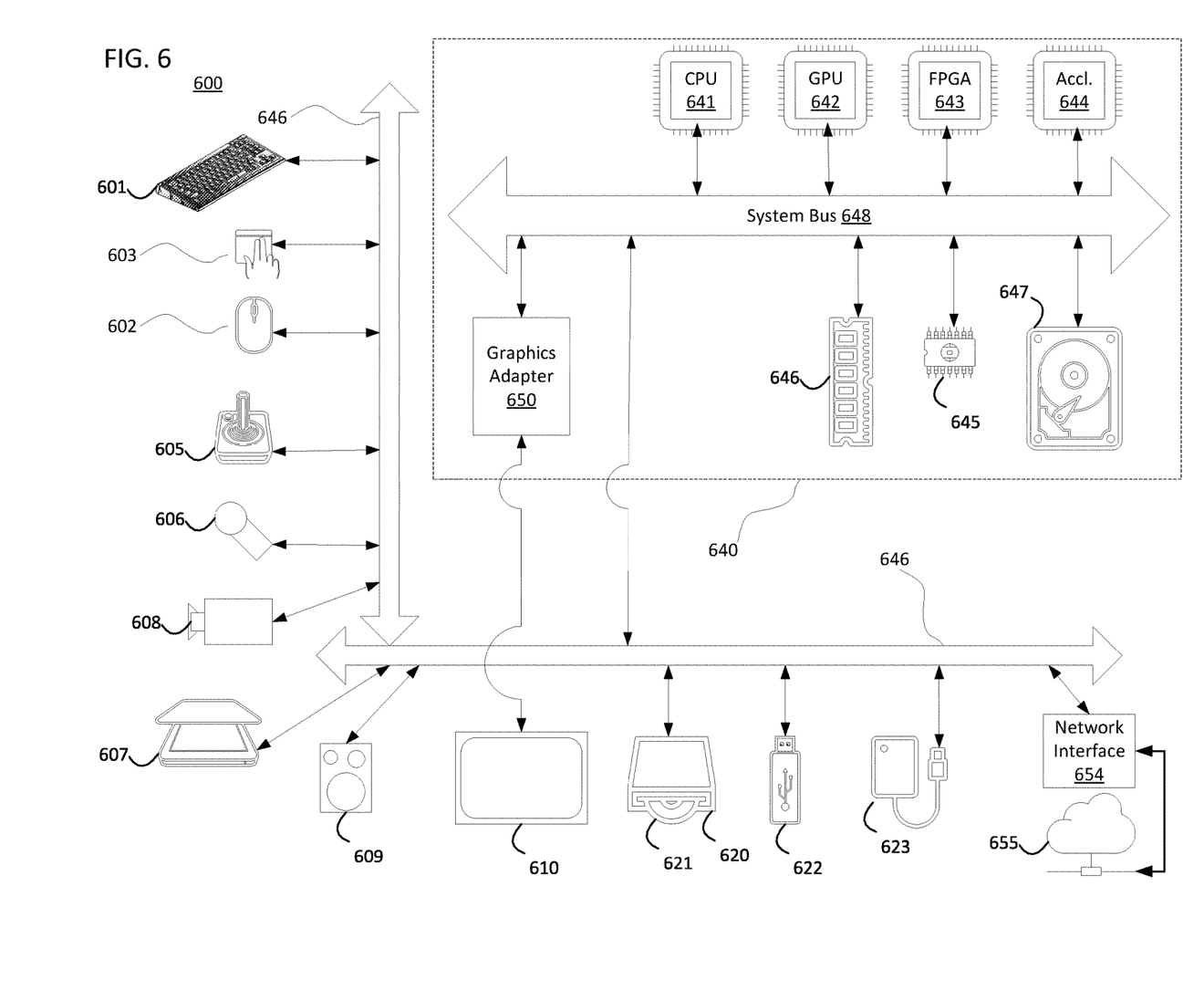
FIG. 6 is a schematic illustration of a computer system in accordance with an embodiment.

With reference to FIG. 6, a computer system (600) suitable for implementing certain embodiments of the disclosed subject matter is illustrated.

The computer software can be coded using any suitable machine code or computer language, that may be subject to assembly, compilation, linking, or like mechanisms to create code including instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 6 for computer system (600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (601), mouse (602), trackpad (603), touch-screen (610), joystick (605), microphone (606), scanner (607), and camera (608).

Computer system (600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (610), data-glove, or joystick (605), but there can also be tactile feedback devices that do not serve as input devices. For example, such devices may be audio output devices (such as: speakers (609), headphones (not depicted)), visual output devices (such as screens 610 to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (600) can also include human accessible storage devices and their associated media such as optical media including CD/DVD ROM/RW (620) with CD/DVD or the like media (621), thumb-drive (622), removable hard drive or solid state drive (623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (600) can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (649) (such as, for example USB ports of the computer system (600); others are commonly integrated into the core of the computer system (600) by attachment to a system bus as described below (for example Ethernet interface into a PC computer system or cellular network interface into a smartphone computer system). Using any of these networks, computer system (600) can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment (655). Certain protocols and protocol stacks can be used on each of those networks and network interfaces as described above.

Aforementioned human interface devices, human-accessible storage devices, and network interfaces (654) can be attached to a core (640) of the computer system (600).

The core (640) can include one or more Central Processing Units (CPU) (641), Graphics Processing Units (GPU) (642), specialized programmable processing units in the form of Field Programmable Gate Areas (FPGA) (643), hardware accelerators (644) for certain tasks, and so forth. These devices, along with Read-only memory (ROM) (645), Random-access memory (RAM) (646), internal mass storage such as internal non-user accessible hard drives, SSDs, and the like, may be connected through a system bus (648). In some computer systems, the system bus (648) can be accessible in the form of one or more physical plugs to enable extensions by additional CPUs, GPU, and the like. The peripheral devices can be attached either directly to the core's system bus (648), or through a peripheral bus (649). Architectures for a peripheral bus include PCI, USB, and the like. A graphics adapter (650) may be included in the core (640).

CPUs (641), GPUs (642), FPGAs (643), and accelerators (644) can execute certain instructions that, in combination, can make up the aforementioned computer code. That computer code can be stored in ROM (645) or RAM (646). Transitional data can be also be stored in RAM (646), whereas permanent data can be stored for example, in the mass storage (647) that is internal. Fast storage and retrieve to any of the memory devices can be enabled through the use of cache memory, that can be closely associated with one or more CPU (641), GPU (642), mass storage (647), ROM (645), RAM (646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (600) having architecture, and specifically the core (640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (640) that are of non-transitory nature, such as core-internal mass storage (647) or ROM (645). The software implementing various embodiments of the present disclosure can be stored in such devices and executed by core (640). A computer-readable medium can include one or more memory devices or chips, according to particular needs. The software can cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition or as an alternative, the computer system can provide functionality as a result of logic hardwired or otherwise embodied in a circuit (for example: accelerator (644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting example embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method performed by at least one processor included in an unmanned aerial system (UAS), the method comprising:
    transmitting, to a UAS Service Supplier (USS) implemented on at least one server, a first registration request to register a first remote identification (RID) corresponding to the UAS with the USS;
    receiving, from the USS, an indication that the first RID is a duplicate RID that is registered with the USS;
    determining, based on the first RID, a second RID corresponding to the UAS; and
    transmitting, to the USS, a second registration request to register the second RID.

2. The method of claim 1, further comprising:
    receiving, from the USS, an indication that the UAS is registered with the USS based on the second RID; and
    preparing an unmanned aerial vehicle (UAV) associated with the UAS for flight based on the second RID.

3. The method of claim 1, wherein the first RID comprises an American National Standards Institute/Consumer Technology Association (ANSI/CTA)-2063-A serial number.

4. The method of claim 3, wherein the ANSI-CTA-2063-A serial number is coded into hardware of an unmanned aerial vehicle (UAV) associated with the UAS.

5. The method of claim 1, wherein the first RID comprises a Civil Aviation Authority (CAA) assigned registration number.

6. The method of claim 1, wherein the determining further comprises:

obtaining a hashed value based on the first RID; and
computing the second RID based on the hashed value.

7. The method of claim 6, wherein the hashed value is a 64-bit hashed value.

8. The method of claim 6, wherein the hashed value is an Overlay Routable Cryptographic Hash Identifiers (OR-CHID) hashed value.

9. The method of claim 6, wherein the second RID comprises an Internet Engineering Task Force (IETF) Hierarchical Host Identity Tag (HHIT) constructed based on the hashed value.

10. A device included in an unmanned aerial system (UAS), the device comprising:
   at least one memory configured to store program code; and
   at least one processor configured to read the program code and operate as instructed by the program code, the program code including:
      first transmitting code configured to cause the at least one processor to transmit, to a UAS Service Supplier (USS) implemented on at least one server, a first registration request to register a first remote identification (RID) corresponding to the UAS with the USS;
      first receiving code configured to cause the at least one processor to receive, from the USS, an indication that the first RID is a duplicate RID that is registered with the USS;
      determining code configured to cause the at least one processor to determine, based on the first RID, a second RID corresponding to the UAS; and
      second transmitting code configured to cause the at least one processor to transmit, to the USS, a second registration request to register the second RID.

11. The UAS of claim 10, wherein the program code further comprises;
   second receiving code configured to cause the at least one processor to receive, from the USS, an indication that the UAS is registered with the USS based on the second RID; and
   preparing code configured to cause the at least one processor to prepare an unmanned aerial vehicle (UAV) associated with the UAS for flight based on the second RID.

12. The UAS of claim 10, wherein the first RID comprises an American National Standards Institute/Consumer Technology Association (ANSI/CTA)-2063-A serial number.

13. The UAS of claim 12, wherein the ANSI-CTA-2063-A serial number is coded into hardware of an unmanned aerial vehicle (UAV) associated with the UAS.

14. The UAS of claim 10, wherein the first RID comprises a Civil Aviation Authority (CAA) assigned registration number.

15. The UAS of claim 10, wherein the determining code further comprises:
   obtaining code configured to cause the at least one processor to obtain a hashed value based on the first RID; and
   computing code configured to cause the at least one processor to compute the second RID based on the hashed value.

16. The UAS of claim 15, wherein the hashed value is a 64-bit hashed value.

17. The UAS of claim 15, wherein the hashed value is an Overlay Routable Cryptographic Hash Identifiers (OR-CHID) hashed value.

18. The UAS of claim 15, wherein the second RID comprises an Internet Engineering Task Force (IETF) Hierarchical Host Identity Tag (HHIT) constructed based on the hashed value.

19. A non-transitory computer-readable medium storing instructions, the instructions comprising: one or more instructions that, when executed by at least one processor of a device included in an unmanned aerial system (UAS), cause the at least one processor to:
   transmit, to a UAS Service Supplier (USS) implemented on at least one server, a first registration request to register a first remote identification (RID) corresponding to the UAS with the USS;
   receive, from the USS, an indication that the first RID is a duplicate RID that is registered with the USS;
   determine, based on the first RID, a second RID corresponding to the UAS; and
   transmit, to the USS, a second registration request to register the second RID.

20. The non-transitory computer-readable medium of claim 19, wherein the one or more instructions further cause the at least one processor to:
   receive, from the USS, an indication that the UAS is registered with the USS based on the second RID; and
   prepare an unmanned aerial vehicle (UAV) associated with the UAS for flight based on the second RID.

* * * * *